United States Patent Office 3,632,790
Patented Jan. 4, 1972

3,632,790
THERMOPLASTIC COMPOSITIONS BASED ON OLEFIN POLYMERS AND NYLONS
Herbert Naarmann, Ludwigshafen, Germany, assignor to Badische Anilin- & Soda-Fabrik Aktiengesellschaft, Ludwigshafen (Rhine), Germany
No Drawing. Filed Jan. 23, 1969, Ser. No. 793,605
Claims priority, application Germany, Feb. 1, 1968, P 16 69 760.2
Int. Cl. C08f 29/12, 45/10
U.S. Cl. 260—37 N
3 Claims

ABSTRACT OF THE DISCLOSURE

Polyolefin-based thermoplastic molding compositions which contain powdered asbestos and an adhesion promoter. The molding compositions contain asbestos having a water content of from 2 to 4% by weight and, as the adhesion promoter, a polyamide derived from (I) an aliphatic saturated $C_4$-$C_{12}$ monoaminocarboxylic acid an/or (II) an aliphatic saturated $C_4$-$C_{12}$ diamine and an aliphatic saturated $C_4$-$C_{12}$ dicarboxylic acid.

---

The present invention relates to polyolefin-based thermoplastic molding compositions containing powdered asbestos and an adhesion promoter (for promoting adhesion between olefin polymer and asbestos).

Molding compositions of the said type are known to be of considerable industrial interest because they give moldings which have much greater stiffness than an olefin polymer alone. Extensive use of the molding compositions is prevented however by the fact that moldings prepared therefrom are unsatisfactory as regards other mechanical properties, particularly their tensile strength and elongation.

The present invention has for its object to provide molding compositions of the said type which do not have the said disadvantages or have them only to a greatly reduced extent.

We have found that this object is achieved by using (a) asbestos containing water and (b) an adhesion promoter.

According to this invention, a thermoplastic molding composition based on an olefin polymer comprises an olefin polymer, powdered asbestos and an adhesion promoter. The molding composition according to this invention contains (a) asbestos having a water content of from 2 to 4% by weight and (b) as the adhesion promoter a polyamide derived from (I) an aliphatic saturated $C_4$-$C_{12}$ monoamino monocarboxylic acid and/or (II) an aliphatic saturated $C_4$-$C_{12}$ diamine and an aliphatic saturated $C_4$-$C_{12}$ dicarboxylic acid, the polyamide having a molecular weight of from 2000 to 25,000.

Moldings made from such molding compositions have a higher tensile strength and better elongation than moldings made from comparable prior art molding compositions.

Conventional olefin polymers are suitable for the molding compositions according to this invention.

Polypropylene having a high-load melt index (according to ASTM D 1238–62 T; measured at 190° C. with a load of 21.6 kg.) of 1.5 to 25 and a fraction soluble in boiling n-heptane of from 10 to 30% is particularly suitable.

Conventional types of powdered asbestos may be used. Chrysotile asbestos is particularly suitable. The asbestos should have a water content of from 2 to 4% by weight. The particle size of the powder is advantageously less than 0.1 mm.

Commercial types of polyamides which satisfy the specification given above are suitable. Polyamides of the type of nylon 6, nylon 6,6 and nylon 12,6 are particularly suitable. The molecular weight of the polyamides is preferably from 10,000 to 20,000.

The relative proportions of the components of the molding material are advantageously chosen so that 25 to 50 parts, preferably 28 to 37 parts, by weight of asbestos is present for each 100 parts by weight of olefin polymer and 0.1 to 70 parts, preferably 5 to 40 parts, by weight of adhesion promoter is used for each 100 parts by weight of asbestos.

The molding compositions may also contain conventional additives, for example pigment dyes, stabilizers, slip additives and fillers.

Molding compositions according to the invention may be made in conventional equipment, for example screw extruders; the operating temperature may in many cases be advantageously from 20° to 50° C. above that for the olefin polymer alone.

The molding compositions may be processed into the usual moldings in conventional equipment; the molding compositions are especially suitable for the manufacture of seals and moldings for the automobile and electrical industries in which high rigidity, corresponding to a high G-modulus, in the temperature range above 100° C. is required.

The invention is illustrated by the following examples. The parts specified in the examples are parts by weight.

EXAMPLE 1

A mixture of 100 parts of a polypropylene (high-load melt index: 2.5 according to the said ASTM standard; fraction soluble in boiling n-heptane: 20% by weight) 30 parts of chrysotile asbestos (adjusted to a water content of 3% by weight) and 3 parts of a nylon-6,6 (from hexamethylenediamine and adipic acid; molecular weight 15,000) is homogenized (ten minutes) at 215° C. in a twin-screw extruder.

The ultimate tensile strength (305 kg./cm.$^2$) and elongation (470%) of the molding composition prepared in this manner are markedly better than those of an analogous molding composition which does not contain any polyamide (ultimate tensile strength: 215 kg./cm.$^2$; elongation: 310%). As regards the G-modulus there is hardly any difference; in the first case it is $6.8 \times 10^9$ dynes/cm.$^2$, in the latter case it is $6.7 \times 10^9$ dynes/cm.$^2$.

EXAMPLES 2 TO 8

The procedure of Example 1 is followed but with the modifications indicated in the following table, which also gives the characteristic data of the molding material obtained.

The following abbreviations are used:

Ex=Example No.
As=parts of asbestos
P=parts of polyamide
AT=type additive
AP=parts additive G-M=G-modulus in $10^9$ dynes/cm.$^2$
UTS=ultimate tensile strength in kg./cm.$^2$
Elo=Elongation percent
PTBA=poly-tertiary-butyl acrylate having a K value of 59
CB=carbon black
SG=silica gel
ETBAC=ethylene-tertiary-butyl acrylate copolymer with 85% by weight of ethylene units; K value 90.5
PFA=polyformaldehyde having a molecular weight of 200,000

TABLE

| Ex. | As | P | AT | AP | G-M | UTS | Elo |
|---|---|---|---|---|---|---|---|
| 2 | 25 | 3 | | | 5.8 | 314 | 498 |
| 3 | 30 | 5 | PTBA | 5 | 7.2 | 302 | 460 |
| 4 | 30 | 4 | ZnO | 3 | 6.9 | 300 | 415 |
| 5 | 32 | 5 | CB | 10 | 7.5 | 320 | 342 |
| 6 | 35 | 4 | SG | 15 | 7.9 | 290 | 320 |
| 7 | 25 | 3 | ETBAC | 0.5 | 5.9 | 310 | 475 |
| 8 | 25 | 3 | PFA | 15 | 6.8 | 315 | 418 |

I claim:

1. A thermoplastic molding composition comprising a polypropylene having a high-load melt index of from 1.5 to 2.5 and a fraction soluble in boiling n-heptane of from 10 to 30% and (a) a powdered asbestos containing from 2 to 4% of water and (b) as an adhesion promoter a polyamide selected from the group consisting of nylon 6,6, nylon 6, and nylon 12,6, said polyamide having a molecular weight of from 2,000 to 25,000, wherein from 25 to 50 parts by weight of asbestos is present for each 100 parts by weight of olefin polymer and 5 to 40 parts by weight of adhesion promoter is used for each 100 parts by weight of asbestos.

2. A thermoplastic molding composition as claimed in claim 1 wherein from 28 to 37 parts by weight of asbestos is present for each 100 parts by weight of olefin polymer.

3. A thermoplastic molding composition as claimed in claim 1 in which the polyamide has a molecular weight of from 10,000 to 20,000.

References Cited

UNITED STATES PATENTS

| 3,093,255 | 6/1963 | Mesrobiam | 215—1 |
| 3,433,853 | 3/1969 | Earle | 260—857 |
| 3,458,596 | 7/1969 | Foigle | 260—857 |

MORRIS LIEBMAN, Primary Examiner

R. ZAITLEN, Assistant Examiner

U.S. Cl. X.R.

260—41, 857 OL, 897